United States Patent
Snell

(10) Patent No.: US 10,421,395 B2
(45) Date of Patent: Sep. 24, 2019

(54) SIGNALLING SYSTEM

(71) Applicant: Ben Snell, Moville (GB)

(72) Inventor: Ben Snell, Moville (GB)

(*) Notice: Subject to any disclaimer, the term of this patent is extended or adjusted under 35 U.S.C. 154(b) by 0 days.

(21) Appl. No.: 16/131,725

(22) Filed: Sep. 14, 2018

(65) Prior Publication Data

US 2019/0016259 A1    Jan. 17, 2019

Related U.S. Application Data

(63) Continuation of application No. 15/608,457, filed on May 30, 2017, now abandoned.

(30) Foreign Application Priority Data

May 27, 2016   (GB) .................................. 1609390.8

(51) Int. Cl.

| G08B 21/00 | (2006.01) |
|---|---|
| B60Q 1/52 | (2006.01) |
| B60Q 1/30 | (2006.01) |
| B60Q 9/00 | (2006.01) |
| B60P 3/12 | (2006.01) |
| B60R 1/08 | (2006.01) |
| G01S 13/93 | (2006.01) |
| G01S 17/93 | (2006.01) |
| G08G 1/16 | (2006.01) |

(52) U.S. Cl.
CPC .............. *B60Q 1/525* (2013.01); *B60P 3/127* (2013.01); *B60Q 1/305* (2013.01); *B60Q 9/004* (2013.01); *B60Q 9/008* (2013.01); *B60R 1/08* (2013.01); *G01S 13/931* (2013.01); *G01S 17/936* (2013.01); *G08G 1/165* (2013.01); *B60Q 2900/10* (2013.01); *B60Q 2900/30* (2013.01)

(58) Field of Classification Search
CPC ..................................... B60Q 1/00; G02B 1/00
See application file for complete search history.

(56) References Cited

U.S. PATENT DOCUMENTS

| 4,325,052 A * | 4/1982 | Koerner | ................. B60Q 1/305 |
| | | | 250/206 |
| 4,742,387 A * | 5/1988 | Oshima | .................... H04N 9/73 |
| | | | 348/180 |

(Continued)

FOREIGN PATENT DOCUMENTS

| GB | 2054290 A | 2/1981 |
| WO | 9531351 A1 | 11/1995 |

OTHER PUBLICATIONS

United Kingdom Intellectual Property Office Search Report dated Oct. 24, 2016 for corresponding GB Application No. 1609390.8, filed May 27, 2016.

(Continued)

*Primary Examiner* — Shirley Lu
(74) *Attorney, Agent, or Firm* — David D. Brush; Westman, Champlin & Koehler, P.A.

(57) ABSTRACT

A retrofit trailer board system for vehicles is disclosed, including a trailer board carrying a plurality of signalling lights on a surface thereof, and a relaying control unit which is connected between the trailer board and a plurality of optical sensors. Each optical sensor is arranged for removable connection to the exterior surface of respective vehicle lights, each sensor being configured to issue a signal responsive to operation of a vehicle light.

10 Claims, 6 Drawing Sheets

(56) References Cited

U.S. PATENT DOCUMENTS

| | | | | |
|---|---|---|---|---|
| 4,800,471 | A | * | 1/1989 | Lippert .................... B60Q 1/44 340/479 |
| 5,400,225 | A | | 3/1995 | Currie |
| 2003/0189836 | A1 | | 10/2003 | Sparling et al. |
| 2003/0231503 | A1 | | 12/2003 | Therriault et al. |
| 2011/0133907 | A1 | * | 6/2011 | Stiles .................... B60Q 1/305 340/13.25 |

OTHER PUBLICATIONS

Office Action dated Mar. 16, 2018 for corresponding U.S. Appl. No. 15/608,457, filed May 30, 2017.

* cited by examiner

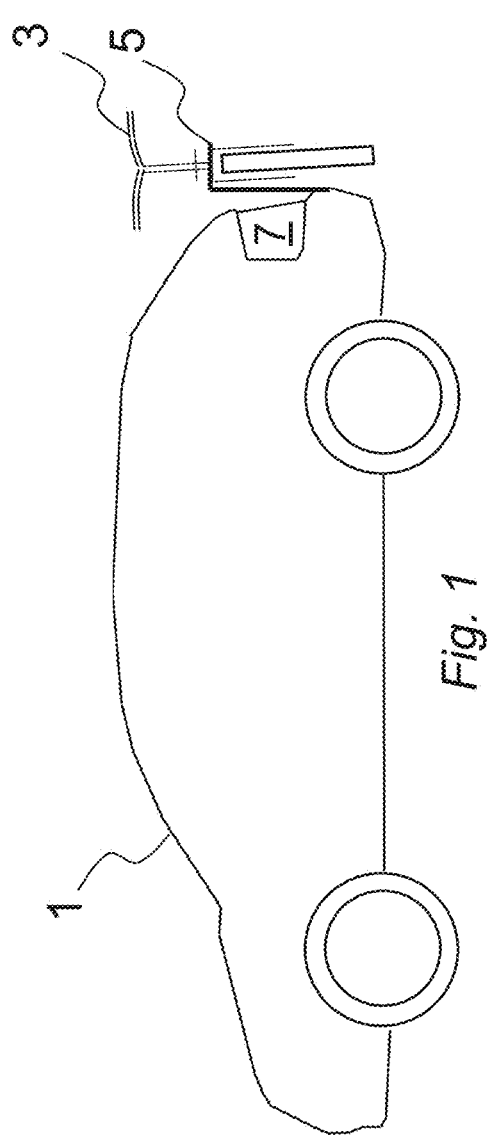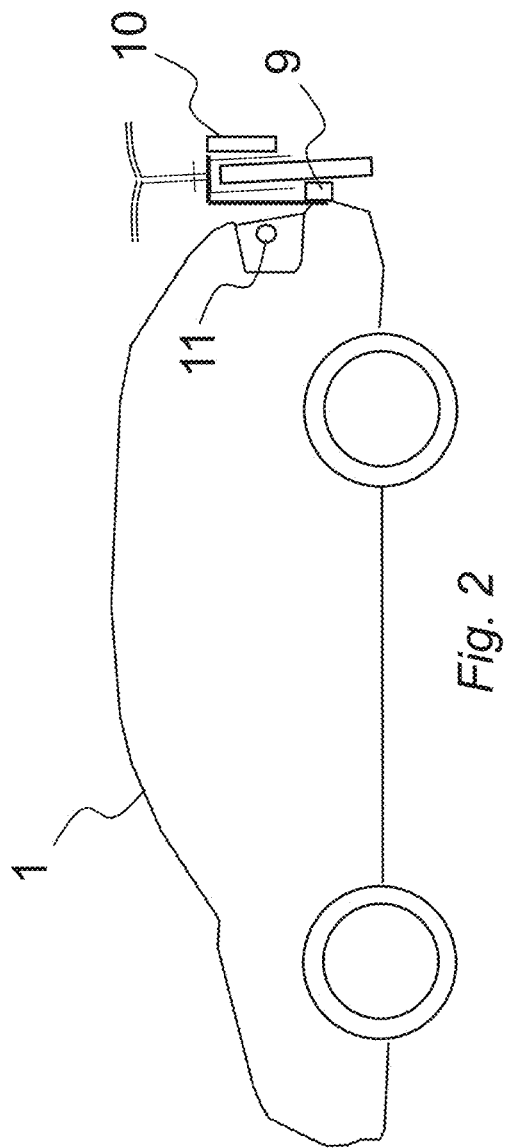

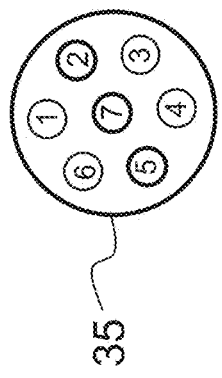
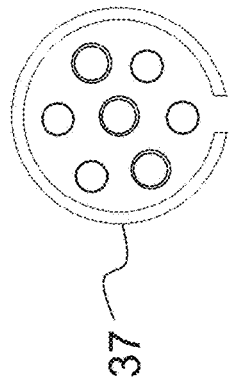
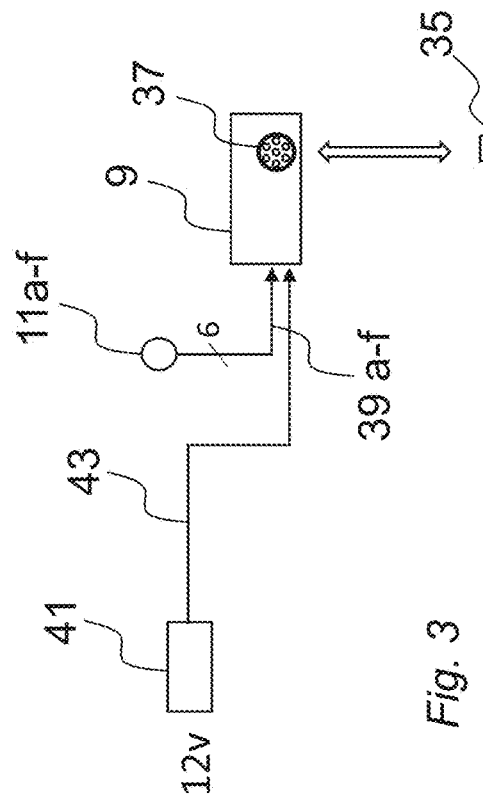
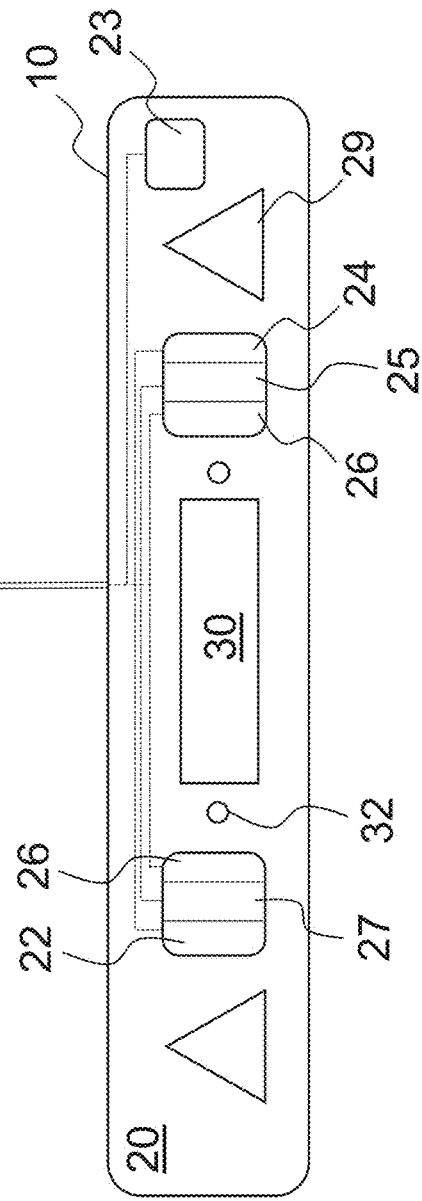

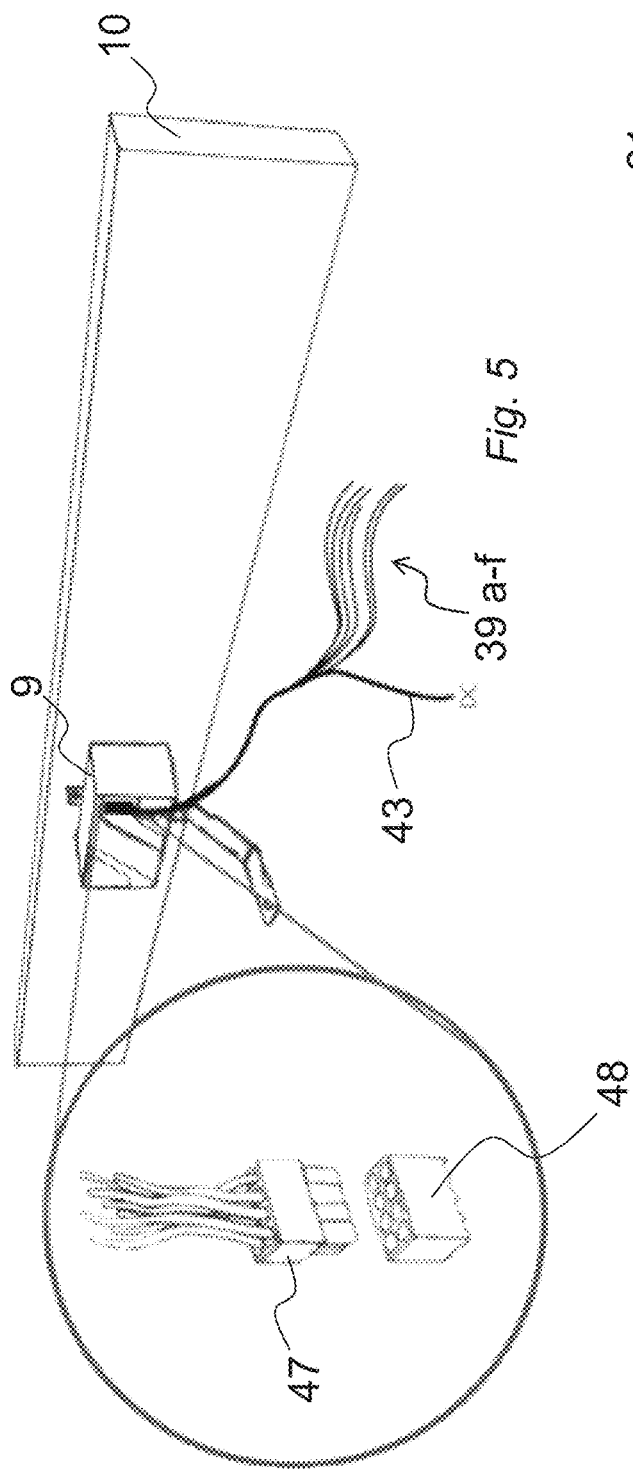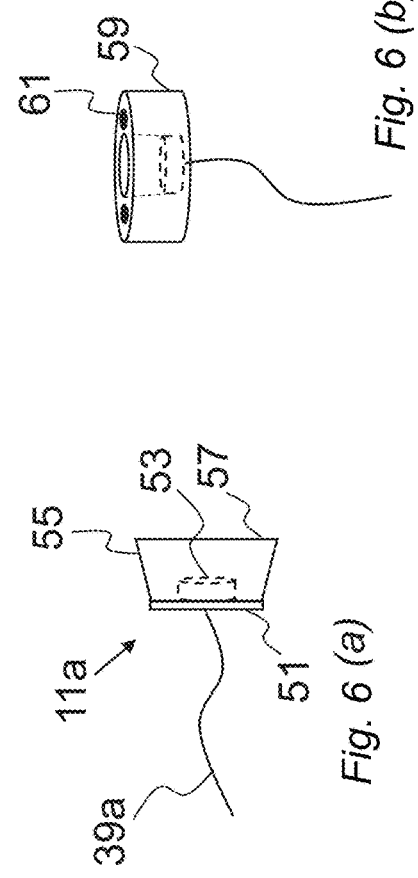

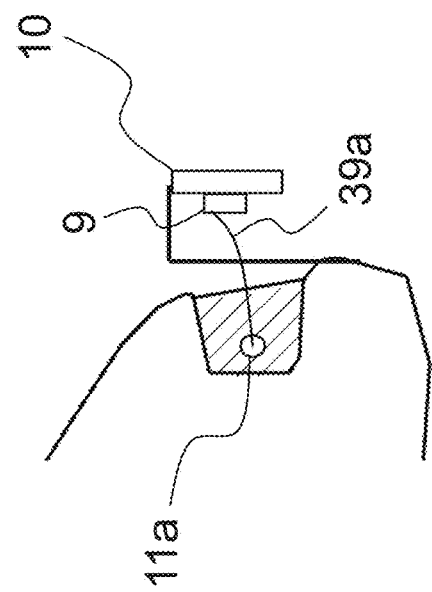
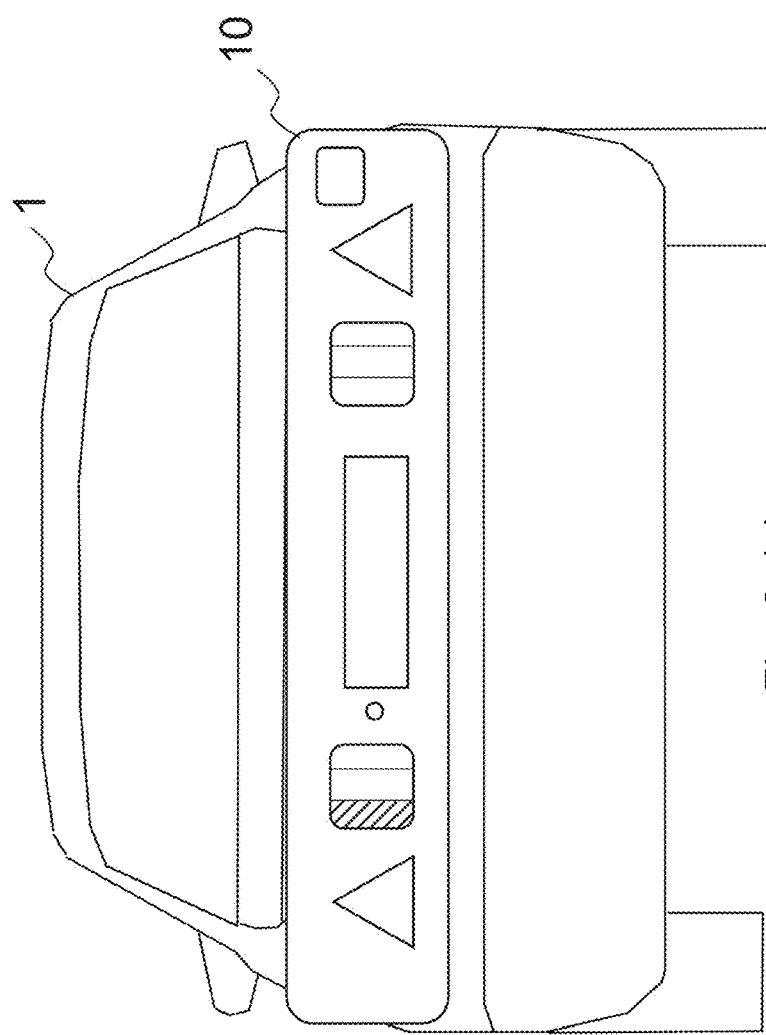
Fig. 8 (b)
Fig. 8 (a)

SIGNALLING SYSTEM

CROSS-REFERENCE TO RELATED APPLICATIONS

This Application is a Continuation Application of U.S. patent application Ser. No. 15/608,457, filed May 30, 2017, which claims priority to and the benefit of United Kingdom Patent Application No. GB1609390.8, filed on May 27, 2016, the contents of which are hereby incorporated by reference in their entireties.

FIELD OF THE DISCLOSURE

This disclosure relates to a signalling system, particularly, though not exclusively for use with a vehicle trailer board.

BACKGROUND OF THE DISCLOSURE

It is common for owners to mount objects such as bicycles onto the rear of their vehicles, usually using a special mounting rack. This tends to obscure some or all of the rear signalling lights which can be dangerous and/or illegal.

Trailer boards are available for mounting to the rear of vehicle trailers or caravans, which trailer boards comprise an elongate board carrying at least a basic set of signalling lights such as tail lights and indicators. The trailer board has a cable terminating with a special plug adapted to detachably connect to an electrical socket on the car, e.g. a 12N plug and socket system. This physical connection takes power from the car battery, and multiple signals from the car's signalling system. The socket on the car needs to be fitted and wired to its electrical and signalling system by a trained installer, and is typically associated with fitting a tow bar attachment or similar. When connected, the trailer board replicates signalling from the car to the signalling lights to ensure that following vehicles can see them.

One issue with trailerboards of the prior art is that the power available from a 12n socket would be close to power capacity. None of the prior art disclose the concept of introducing a micro controller for both TX and reverse sensors retrofit which control both units and also filter out unwanted light in turn omitting any unwanted signals.

Most vehicles are not sold with readily available electrical connectors, particularly external connectors, for relaying signalling to the rear of the vehicle. For owners that simply wish to mount bicycles or similar objects on an occasional basis, there is little or no option for ensuring compliance and safety requirements without having a specially installed tow bar system.

SUMMARY

A first aspect of the disclosure provides a signalling system for vehicles, comprising: one or more optical sensors for removable attachment to a respective vehicle light, which sensors are configured to generate a signal responsive to detecting emitted light from the vehicle light to which it is attached, the system being arranged responsive to receiving a signal from the one or more optical sensors to output a signal to an external signalling unit to cause a corresponding light on said external signalling unit to operate.

Plural optical sensors may be provided, each connected to a control unit by means of respective lengthwise conductors, the control unit comprising circuitry for relaying the sensor signals to corresponding lights of an external signalling unit.

The system may further comprise a trailer board for removable mounting to the rear of a vehicle, the trailer board carrying on a rear surface a plurality of signalling lights, and wherein the control unit is configured to relay sensor signals received from the sensors to a corresponding signalling light on the trailer board.

The or each optical sensor may comprise a light detector surrounded by a wall having an end surface adapted for removable attachment to a vehicle light.

The surrounding wall may be formed of a deformable material with a substantially planar end surface which, in use, is removably attached to a vehicle light by suction.

The surrounding wall may have one or more adhesive parts provided on the end surface for removable attachment to a vehicle light.

The system may comprise a conductor for receiving electrical power from a vehicle, the conductor being terminated by a plug adapted to connect to an existing power outlet of a vehicle, e.g. a cigarette lighter outlet.

The system may comprise an external connector plug or socket adapted to connect to an existing socket or plug of a vehicular trailer board.

The system may further comprise one or more proximity parking sensors adapted for retrofitting to a vehicular trailer board, and means for relaying signals produced by the parking sensors to an audible or visual unit which may be carried within the vehicle. The proximity sensor(s), for example, may be ultrasonic or infrared.

A second aspect of the disclosure provides a retrofit trailer board system for vehicles, comprising: a trailer board carrying a plurality of signalling lights on a surface thereof; a plurality of optical sensors for removable connection to the exterior surface of respective vehicle lights, each sensor being configured to issue a signal responsive to operation of a vehicle light; and an electronic control unit in signal communication with each of the optical sensors and arranged in use to relay signals received from respective optical sensors to a corresponding signalling light of the trailer board.

BRIEF DESCRIPTION OF THE DRAWINGS

The disclosure will now be described by way of example only with reference to the accompanying drawings, in which:

FIG. 1 is a side view of a vehicle on which is mounted a bicycle by means of a bracket;

FIG. 2 is a side view of a vehicle employing a system according to the disclosure;

FIG. 3 is a schematic diagram of a system according to the disclosure used in conjunction with a vehicle trailer board;

FIGS. 4a and 4b show respective plug and socket terminals of a connector, which is useful for understanding the disclosure;

FIG. 5 is a partial perspective view of the system mounted to the rear of a trailer board;

FIGS. 6a and 6b show respective side and perspective views of different sensor examples that may be used with the system;

FIGS. 8a and 8b are respective rear and partial side views of a vehicle with the trailer board mounted;

DETAILED DESCRIPTION OF ILLUSTRATIVE EMBODIMENTS

Figure 7:
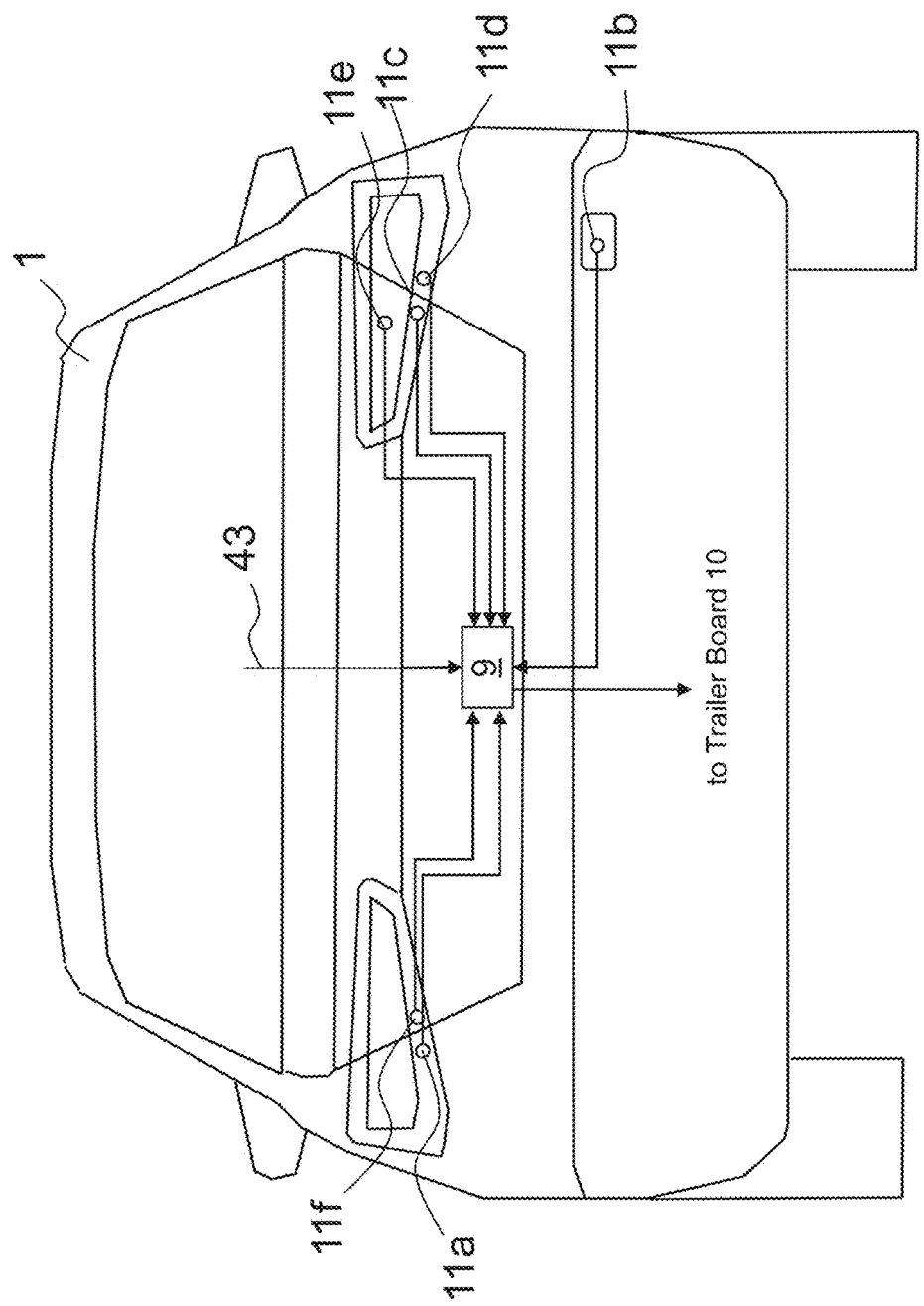
FIG. 7 is a schematic view showing the system and connection of its sensors to rear lamps of a vehicle.

Referring to FIG. 1, there is shown a potential situation in which embodiments of the disclosure may provide advantageous use. There is shown a vehicle 1 to the rear of which is mounted a bicycle 3 by means of a retro-fit bike mounting bracket 5. This common arrangement obscures at least some or all of the rear signalling lights 7 contrary to good safety practise and legislation.

FIG. 2 shows a first embodiment vehicular signalling system for overcoming or alleviating the abovementioned disadvantages, in particular without the need for specialised fitting of an electrical connector to the vehicle exterior. It comprises a signalling control unit 9 which is mounted to the vehicle 1, for example to the rear bumper/fender, to the bracket 5 or even to a trailer board 10, and a plurality of optical light sensors 11 in signal communication with the control unit, and which in use are detachably mountable to respective ones of the rear signalling lights.

A trailer board 10, which may or may not be a conventional trailer board, is mounted behind the bicycle 3 in the conventional manner. The control unit 9 is in signal communication with the trailer board 10 and is configured in use to relay signals sensed by the light sensors 11 to an electrical system of the trailer board 10 so as to mimic in real-time, or near real-time, signalling from the vehicle 1.

In this context, signalling refers to visible output from any or all of the rear tail lights, indicator (turn) lights, fog light(s), and possibly a reversing light.

With reference to FIG. 3, the trailer board 10 is shown and comprises an elongate mounting board 20 carrying on its rear surface a plurality of electrical lights, comprising in this example of:
- a left indicator 22;
- a fog light 23;
- a right indicator 24;
- a right tail light 25;
- brake lights 26; and
- a left tail light 27.

Two reflective triangles 29 are also provided for additional safety, as an option. A mounting area 30 is provided for a registration tail plate, if needed, and optionally one or more mounts 32 are provided for reverse parking sensors, if needed.

Electrical conductors, shown in dotted lines, connect each of the above lights 22-27 to a connector plug 35. The conductors can pass between laminated sheets that form the trailer board 10 and/or may be wires or conductive tracks printed on substrate. The plug 35 can be a conventional plug, e.g. a 12N connector currently used for trailer boards in the UK and certain parts of Europe. Other types of connector can also be employed. FIG. 4a shows the seven-terminal layout of the plug 35, with terminals 1, 3, 4, 6 being spring pins and terminals 2, 5, 7 being tubes.

The control unit 9 comprises circuitry mounted on one or more printed circuit boards and housed within a waterproof casing. A socket 37 is provided on the exterior of the waterproof casing for receiving the plug 35; the socket 37 may be covered by a removable waterproof cap for when not in use. FIG. 4b shows the layout of the socket 37, again a 12N socket, which has the opposite male/female orientation of terminals than that shown in FIG. 4a, with terminals 1, 3, 4, 6 being tubes and terminals 2, 5, 7 being spring pins. The 12N connector is detailed further in the ISO1724 standard.

In the case of the 12N connector, the wiring of the pins correspond to the following signal functions:

| Pin No. | Colour | Function |
| --- | --- | --- |
| 1 | Yellow | Left Indicator |
| 2 | Blue | Fog Light |
| 3 | White | Earth |
| 4 | Green | Right Indicator |
| 5 | Brown | Right Tail/Side Light |
| 6 | Red | Brake/Stop Lights |
| 7 | Black | Left Tail/Side Light |

Connected to the control unit 9 are, in this embodiment, six external optical sensors 11a-f by respective conductors 39a-f. These conductors 39a-f are covered by an insulating sleeve and are of sufficient length to extend to the peripheral edges of the vehicle (where most lights are located) from the centre. Different conductors may have different lengths. Also connected to the control unit 9 is an external 12v plug 41 via lead 43. The 12v plug 41 may be shaped and dimensioned to locate within the provided cigarette lighter receptacle of the vehicle 1, enabling the control unit 9 to be powered by passing the plug and lead 43 through the boot/trunk of the vehicle or some other exterior aperture.

FIG. 5 shows how the control unit 9 can be directly mounted on the rear of the trailer board 10, or integrated into the trailer board when sold. Here, it will be seen that the conductors 39a-f are connected to the control unit 9 by a single plug 47 which locates within a corresponding socket 48 on the control unit.

Each of the optical sensors 11a-f is configured to removably attach to the external surface of the vehicle light cluster, which typically comprises a smooth, transparent plastic cover beneath which bulbs are located. FIGS. 6a and 6b show different types of optical sensor, either of which is suitable. Other types are possible.

Referring particularly to FIG. 6a, which shows only one sensor 11a, it comprises a base member 51, which may be a covered circuit board, onto which is mounted a photodetector 53 or similar component. As will be appreciated, the photodetector 53 generates a signal responsive to emitted light above a certain intensity which it transmits to the conductor 39a. A perimeter wall 55 surrounds the photodetector 53 for the purpose of preventing or mitigating other light sources from affecting the operation of the photodetector, and/or debris such as mud from the road affecting performance. In this case, the perimeter wall 55 is provided in the form of a suction cup made of relatively flexible and deformable material such as rubber which enables straightforward removable attachment of its flat, end surface 57 to the cover of a selected vehicle lamp.

Referring to FIG. 6b, in an alternative embodiment, the sensor 11a comprises a deformable or non-deformable perimeter wall 59 which likewise surrounds the photodetector 53 and which attaches to the vehicle lamp using one or more adhesive stickers 61, such as provided by 3M (typically referred to as "dual lock coins"). Other forms of adhesion or attachment can be employed, e.g. using a hook and loop system.

Referring to FIG. 7, a typical attachment of the signalling system, particularly the sensors 11a-f, to the rear lights of a vehicle 1 is shown. In practice, each of the sensors 11a-f will be labelled for user-attachment to a corresponding one of the rear lights, e.g. using a number or colour code. The table below shows an example. Placement of the sensor over the appropriate rear light is for the user to manage.

| Sensor | Colour | Function |
|--------|--------|----------|
| 11a | Yellow | Left Indicator |
| 11b | Blue | Fog Light |
| 11c | Green | Right Indicator |
| 11d | Brown | Right Tail/Side Light |
| 11e | Red | Brake/Stop Lights |
| 11f | Black | Left Tail/Side Light |

In use, the circuitry within the control system 9 is arranged such as to detect the one or more signals produced by the sensors 11*a-f* and to relay these to the corresponding signal lamp provided on the trailer board 10 as shown in FIGS. 8*a* and 8*b* which are rear and partial side views respectively. The term 'relay' in this sense means to receive and pass on. In some embodiments, processing is involved, for example by means of detecting the signal strength from the sensors 11*a-f* and only issuing a signal to the corresponding lamp of the trailer board 10 if the signal strength is above a predetermined threshold. This helps avoid, for example, ambient light at one of the sensors 11*a-f* causing a lamp to erroneously turn on. In this sense, signal strength refers to the brightness or intensity of the sensed light, which could be represented in analogue or digital form.

Figure 9:
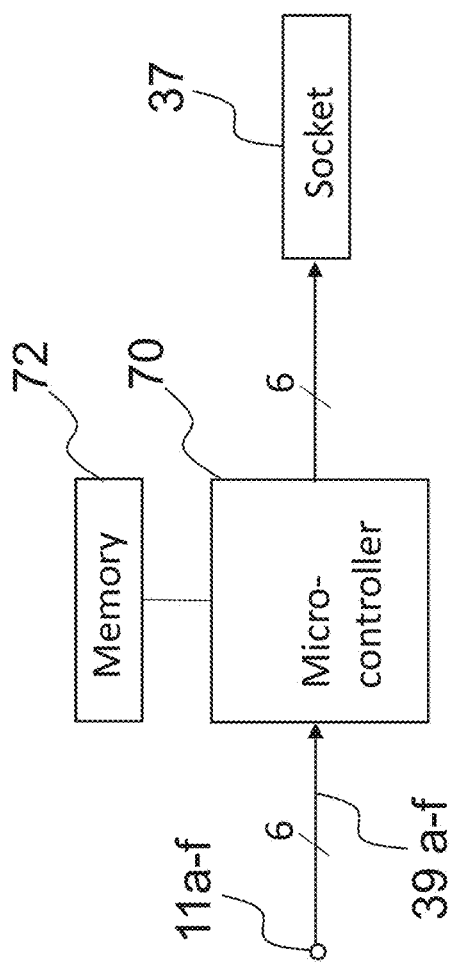
FIG. 9 is a schematic view of components which may comprise the system, at least in part.

The control system 9 may be provided in hardware, software or a combination of both. FIG. 9 shows one example in which the control system 9 comprises a microcontroller 70 and a memory 72.

The controller 70 can be one or more processors, one or more microcontrollers or a combination of the two. The presence of the micro-controller 70 ensures that "false triggers" caused by light pollution from other sources can be effectively filtered out.

The memory 72 can be a separate hardware module or provided 'on-board' the controller 70. The memory 72 can be implemented in any form. The memory 72 can store a program which, when executed by the controller 70, performs certain functions of the control system 9.

Figure 10:
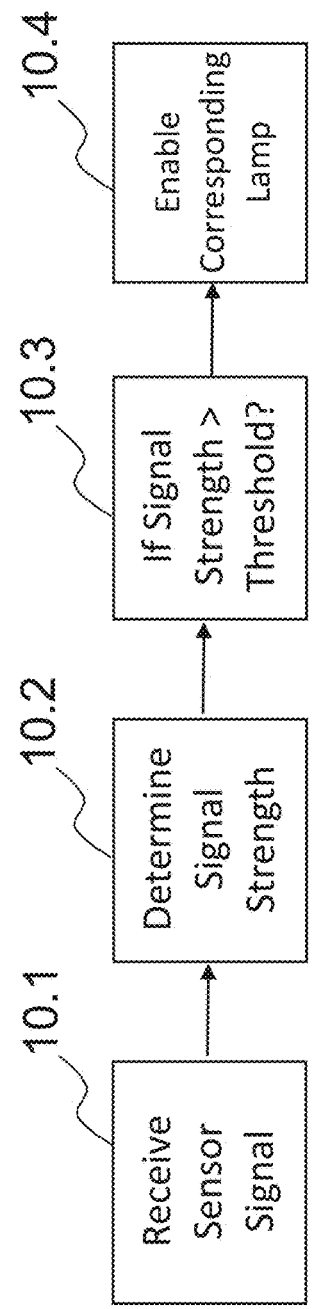
FIG. 10 is a flow diagram showing processing steps performed by the FIG. 9 components.

As an example, FIG. 10 shows in overview the steps performed by a program stored on the memory 72 when executed on the controller 70. In a first step 10.1, a signal is received from one or more of the sensors 11*a-f*. In step 10.2 the signal strength from the, or each, signal is measured. In step 10.3 for each received signal it is determined if the signal strength is above a predetermined threshold. If so, in step 10.4 the corresponding lamp is enabled by means of issuing a corresponding signal to the appropriate terminal of the socket 37. It will be appreciated that these steps can be implemented in hardware, as opposed to software, or using a combination of both.

In some embodiments, the controller 70 may be a microcontroller programmed to work in tandem with an embedded analog to digital converter (ADC) to process voltage level samples and compare them to a programmed or runtime adjustable threshold voltage; based on these values, and in some cases combinations of values, the microcontroller illuminates the respective lights of the trailer board 10.

The microcontroller 70 may continually instruct the ADC to sample voltage levels from the respective sensor pins, connected to respective sensors 11*a*-11*f* through printed circuit board connectors and traces. The sensors 11*a*-11*f* may provide a voltage level to the respective pins on the microcontroller 70 which is dependent on the light intensity the sensors are receiving. The ADC passes the converted digital samples to the microcontroller 70. The microcontroller 70 continuously monitors the digital samples and determines whether or not they are above a threshold voltage. If the digital sample is above the threshold value and/or if a multiplicity of these digital samples are above the threshold value at the same time (in the case of braking) then the microcontroller 70 toggles the relevant output pin or pins. When the relevant output pin or pins is toggled, the appropriate light on the trailer board 10 is then illuminated.

The microcontroller 70 is part of the transmission lights controller board and is one of many components required to make the system work. The microcontroller 70 samples the voltage levels from the sensors through the ADC. The microcontroller 70 is programmed to compare the voltage levels that are sampled and determine if they are above a threshold or below a threshold. If the voltage levels from the ADC are above a threshold, the microcontroller 70 controls one of its output port pins to go high, causing the respective light on the trailer board 10 to illuminate.

A communications peripheral may be provided on the microcontroller 70 in order to communicate with external devices (e.g. an ultrasonic portion of the product to be described below, which serves as a distance measurement to aid in reversing and parking; other applications may also arise in the future for coupling to the product.) Program and Processing instructions are stored in the microcontroller 70 allowing it to control The ability for the microcontroller 70 and ADC to work in tandem to sample signals provides a precise and consistent way of implementing this product. The microcontroller 70 is a programmable device and can be programmed with diagnostic and fault tolerant code to increase reliability and detect and correct for issues while in operation.

In some embodiments, any or all of the above-mentioned conductors between the control system 9 and the sensors 11*a-f* and the trailer board 10 can be replaced with wireless communications devices, e.g. using Bluetooth as a wireless communications protocol.

In some embodiments, a parking sensor facility may be incorporated into the control system 9. More specifically, housed within the casing of the control system 9 will be circuitry, being a parking sensor controller, which draws power from the above-mentioned components connected to the car's power supply. One or more further conductors will extend from the control system 9 to respective ultrasonic parking sensors which can, e.g. locate within respective mounting holes or recesses 32 of the trailer board 10 as indicated in FIG. 3. Additionally, therefore, a retro-fit reverse parking system can be provided to account for the vehicle 1 having no such facility, or in which the vehicle's own sensors are obscured by objects mounted to the rear or by the trailer board itself. The audible indication provided by the parking sensor controller can be made via a speaker on the controller, and/or by a separate speaker that can locate within the vehicle itself and which receives signals from the controller by wired or wireless means. Additionally, or alternatively, an application for running on a smartphone or the like can be provided, and arranged to pair and communicate with the parking sensor wirelessly to provide an indication of object proximity.

In some embodiments, the control system 9 can be provided as a separate module for use with existing trailer boards available on the market. In other embodiments, the control system 9 can be provided as part of a trailer board assembly, being a stand-alone product for purchase.

The reverse parking sensors, for example, may be provided as a separate module such that they are separate from the other sensors. An existing trailerboard socket found on the vehicle is connected to the reverse parking sensor controller to receive a signal from the controller.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A signalling system for vehicles, comprising:
one or more optical sensors for removable attachment to a respective vehicle light, which sensors are configured to generate a signal responsive to detecting emitted light from the vehicle light to which it is attached, the system being arranged responsive to receiving a signal from the one or more optical sensors to output a signal to an external signalling unit to cause a corresponding light on said external signalling unit to operate;
one or more proximity sensors configured to retrofit to a vehicular trailer board, and means for relaying signals produced by at least one parking sensor to an audible or visual unit which may be carried within the vehicle;
the one or more optical sensors are provided, each connected to a control unit by means of respective lengthwise conductors, the control unit comprising circuitry for relaying the sensor signals to corresponding lights of an external signalling unit;
a trailer board for removable mounting to the rear of a vehicle, the trailer board carrying on a rear surface a plurality of signalling lights, and wherein the control unit is configured to relay sensor signals received from the sensors to a corresponding signalling light on the trailer board;
wherein each of the at least one optical sensors comprises a light detector surrounded by a wall having an end surface configured to removably attach to the vehicle light.

2. The signalling system of claim 1, wherein the surrounding wall is formed of a deformable material with a substantially planar end surface which, in use, is removably attached to a vehicle light by suction.

3. The signalling system of claim 1, wherein the surrounding wall has one or more adhesive parts provided on the end surface for removable attachment to a vehicle light.

4. The signalling system of claim 1, wherein the system comprises a conductor for receiving electrical power from a vehicle, the conductor being terminated by a plug configured to connect to an existing power outlet of a vehicle.

5. The signalling system of claim 1, wherein the system comprises an external connector plug or socket configured to connect to an existing socket or plug of a vehicular trailer board.

6. The signalling system of claim 1, wherein the system is arranged responsive to receiving the signal from the one or more optical sensors, to determine the strength or intensity of light detected by said sensor, and to output the signal to the external signalling unit only if said strength or intensity is above a predetermined threshold.

7. The signalling system of claim 6, wherein the system comprises a microcontroller with an on-chip analog to digital converter configured to sample an input signal indicative of the strength or intensity of light detected by said sensor(s), and to determine if the digital representation of said sampled input signal(s) is or are above the predetermined threshold stored in on-chip memory.

8. The signalling system of claim 1, wherein plural optical sensors are provided, each connected to a control unit by means of respective lengthwise conductors, the control unit comprising circuitry for relaying the sensor signals to corresponding lights of an external signalling unit.

9. The signalling system of claim 1, further comprising a trailer board for removable mounting to the rear of a vehicle, the trailer board carrying on a rear surface a plurality of signalling lights, and wherein the control unit is configured to relay sensor signals received from the sensors to a corresponding signalling light on the trailer board.

10. The signalling system of claim 1, wherein the or each optical sensor comprises a light detector surrounded by a wall having an end surface configured to removably attach to the vehicle light.

* * * * *